March 7, 1961 K. L. TREIBER 2,973,948
SNOW SAW AND SEPARATION LAYER
Filed Nov. 6, 1958
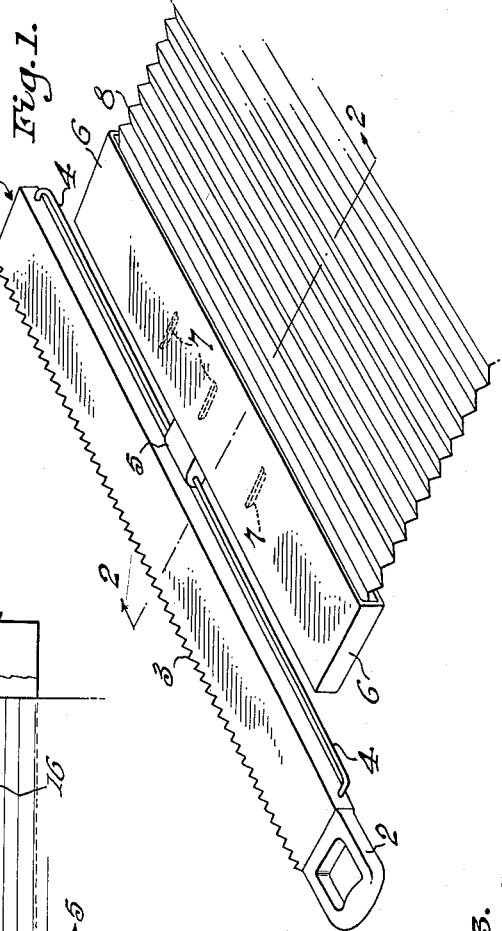
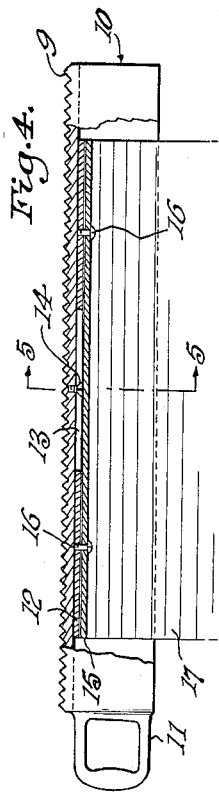
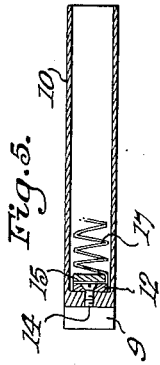
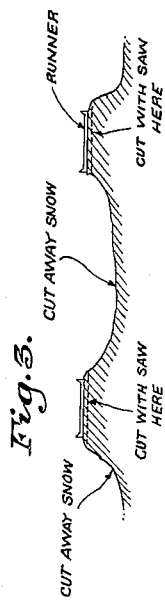
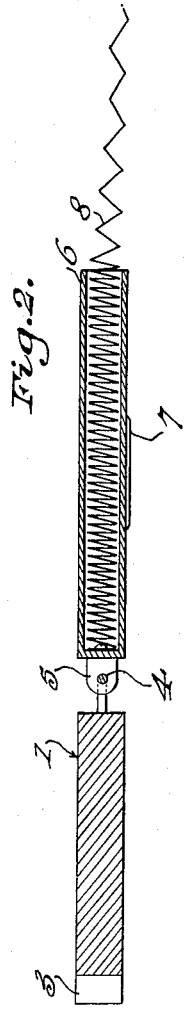
INVENTOR.
Kenneth L. Treiber
BY
ATTORNEYS United States Patent Office 2,973,948
Patented Mar. 7, 1961

2,973,948
SNOW SAW AND SEPARATION LAYER
Kenneth L. Treiber, 1006 Duke Drive, Alexandria, Va.
Filed Nov. 6, 1958, Ser. No. 772,388
6 Claims. (Cl. 262—1)
(Granted under Title 35, U.S. Code (1952), sec. 266)

The invention described herein may be manufactured and used by or for the Government for governmental purposes without the payment of any royalty thereon.

This invention relates to means for separating frozen supports and the like from their surrounding medium and insuring retention of the separation by insertion of another element therebetween to prevent a frozen bond from re-forming.

It is well known that in very cold climates a moving vehicle will, by its weight and friction, cause a slight melting at its points of contact with frozen ground, ice, or snow, and if the vehicle then is left standing for any substantial time, re-freezing of the melted surface thereafter causes immobility of the vehicle. Attempts to cut through the underlayer of the frozen element often are futile because the material that has melted or softened re-freezes almost immediately when the vehicle becomes stationary. This problem is solved by the present invention in that the cutting of the underlayer is accompanied by placing a layer of cloth, paper or the like in the cut, thereby preventing contact between the resulting separated frozen surface.

Other methods of separating the vehicle from the frozen element such as by application of heat can be dangerous and expensive.

The general object of this invention is to provide a saw which can undercut a frozen sled runner, tractor tread, wheel or the like and deposit in its wake a tough sheet of ply material which prevents re-freezing of the vehicle to the ice or snow and provides the necessary traction to allow the vehicle to be moved.

It is another object of this invention to provide an efficient and simple means that is safe and inexpensive to free ice-bound and snow-bound vehicles.

Preferred embodiments of the invention are shown in the accompanying drawings by way of illustrative examples, in which:

Fig. 1 is a perspective view of the invention showing a portion of a separation element removed from its holder;

Fig. 2 is a sectional view taken on line 2—2 of Fig. 1, looking in the direction of the arrows;

Fig. 3 is a diagrammatic view showing the preferred way of operating the saw in accordance with the present invention;

Fig. 4 is a plan view partly in section of a modification of the invention with parts being broken away; and Fig. 5 is a sectional view on line 5—5 of Fig. 4, looking in the direction of the arrows.

Referring in greater detail to the drawings, and first more particularly to Figs. 1 and 2, it is seen that the saw 1 with its handle 2 and standard ice saw tooth profile 3 has a guide bar 4 at the rear. A holder 5 slides along the bar and carries with it a flaking box 6. The box 6 carries in it preferably a four-ply material 8 having sealed edges which retain dry air within each double ply (not shown). This material is stored in the box in accordion pleats ready for flaking. The box 6 has snow fins 7 which prevent reciprocal movement of the box with the saw 1 and at the same time permit it to move in the longitudinal direction of the cut being made.

Figs. 4 and 5 illustrate another modification of the invention. The ice saw 10 is shown with its standard handle 11 and blade 9. The saw is hollow to permit insertion of the material 17 to be flaked out into the cut. The material is held in place by strip 15 which is secured in turn to a slidable section 12 by screws 16. Section 12 has a slot 13 in which screw 14 rides. Screw 14 connects to the center of saw 10.

In the operation of the first embodiment shown in Figs. 1 and 2, as the saw 1 makes the cut, the flaking box 6 remains stationary with respect to the transverse movements of the saw, aided in part by the snow fins 7. As the saw proceeds in making the cut, the four-ply material 8 which can be a heavy paper or cloth which has previously been pulled out at the start, continues to flake out of the flake box 6. At the finish of the cut, the material 8 lies in the cut between the sled runner 1, etc., and the frozen element.

The embodiment shown in Figs. 4 and 5 works in the same general manner. The flake box 6, which is separated in the first embodiment is incorporated into the body of the saw in this modification. The flaking material 17 is inserted into the saw and held in place by strip 15 and screws 16. The slidable section 12 remains stationary with respect to the saw's transverse movements, and is drawn into the cut made by the saw 9 through the action of the screw 14 in slot 13. The wedge-shaped head of the screw 14 and the wedge-shaped (in cross section) slot serve to hold section 12 in place. Again the flaked material is pulled out at the start and held in place so that it continues to flake out as the cut is made, putting a layer of material in the cut between the support and the frozen element. The transverse movement of saw 10 is limited to the length of slot 13 in this second embodiment.

Fig. 3 is a sketch showing the terrain when a cut is to be made. The snow is first cut away from the runners to allow room for the saw. The cut then made just below the runner. When both cuts are made, the vehicle is loose from the snow and has traction from the material left behind by the saw.

Although the examples given state the use of the invention to be connected with separation of supports from a frozen element, it is apparent that the use can be extended to any situation wherein the cut to be made must be preserved to prevent rebonding of the elements being separated.

It is contemplated to include in these improvements all such changes and variations as fall within the scope of the appended claims. For example, the material may be compressed within the holder in various ways such as in rolls or folds or other methods besides accordion pleats as shown.

I claim:
1. A saw comprising a handle, a blade secured to said handle, a bar longitudinally adjacent to the rear of said blade and connected to said blade at each end thereof, a box slidably connected to said bar, said box having an open side disposed oppositely to said slidable connection, and said box holding folded material having a free end adapted to be pulled out of the open side of said box.

2. A saw as claimed in claim 1, wherein the box has a plurality of fins parallelly disposed on its underside transversely to the cutting movement of the saw.

3. A saw comprising a handle, a cutting edge secured to said handle, a hollow body having an open side mounted rearwardly of said cutting edge, a flexible material contained within said hollow body, and means slidably connecting one edge of said material to the interior of said hollow body, said material having a free end adapted to be pulled out of the open side of said hollow body.

4. A saw as claimed in claim 3, wherein the means slidably connecting one edge of said material to the interior of said hollow body is a flat strip running longitudinally of the cutting edge, said strip having a horizontally elongated slot, fastening means riding freely within said slot, said fastening means centrally attached to said hollow body oppositely of the cutting edge, a second strip demountably attached to said first strip rearwardly of the cutting edge, said second strip cooperating with said first strip so as to hold one end of the pleated material therebetween while allowing the other end to be progressively drawn out of the open side of said hollow body upon forward movement of the saw.

5. A device for dividing a frozen material capable of rebonding, said device comprising a saw having a handle and a cutting means secured to the handle, and a separator material attached to the saw by means permitting relative transverse movement between the material and the saw whereby as the cutting means makes a kerf in the frozen material the separator material will enter the kerf to prevent the frozen material from rebonding.

6. A saw for separating elements capable of rebonding comprising a handle, cutting means secured to said handle, a holder connected to said cutting means by means permitting relative transverse movement between said holder and said cutting means, and a material within said holder having one edge held by means connected to the holder and one end free whereby said material is deposited in the kerf by said saw immediately following formation of the kerf.

References Cited in the file of this patent

UNITED STATES PATENTS

| | | |
|---|---|---|
| 1,356,640 | Lundmark | Oct. 26, 1920 |
| 1,530,927 | Brady | Mar. 24, 1925 |
| 2,471,718 | Breck | May 31, 1949 |